(12) United States Patent
Sanchez et al.

(10) Patent No.: US 11,069,940 B2
(45) Date of Patent: Jul. 20, 2021

(54) IONICALLY CONDUCTIVE MATERIAL FOR ELECTROCHEMICAL GENERATOR AND PRODUCTION METHODS

(71) Applicants: INSTITUT POLYTECHNIQUE DE GRENOBLE, Grenoble (FR); CENTRE NATIONAL DE LA RECHERCHE SCIENTIFIQUE—CNRS, Paris (FR)

(72) Inventors: Jean-Yves Sanchez, Saint-Ismier (FR); Cristina Iojoiu, Vourey (FR); Yannick Molmeret, Grenoble (FR); Claire Antonelli, Madrid (ES)

(73) Assignees: INSTITUT POLYTECHNIQUE DE GRENOBLE, Grenoble (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 65 days.

(21) Appl. No.: 16/317,488

(22) PCT Filed: Jul. 12, 2017

(86) PCT No.: PCT/FR2017/051914
§ 371 (c)(1),
(2) Date: Jan. 11, 2019

(87) PCT Pub. No.: WO2018/011521
PCT Pub. Date: Jan. 18, 2018

(65) Prior Publication Data
US 2019/0229315 A1 Jul. 25, 2019

(30) Foreign Application Priority Data

Jul. 13, 2016 (FR) ...................... 1656760

(51) Int. Cl.
| | | |
|---|---|---|
| H01M 2/14 | (2006.01) |
| H01M 10/0525 | (2010.01) |
| H01M 10/0565 | (2010.01) |
| H01M 10/42 | (2006.01) |

(Continued)

(52) U.S. Cl.
CPC ..... H01M 50/403 (2021.01); H01M 10/0525 (2013.01); H01M 10/0565 (2013.01);
(Continued)

(58) Field of Classification Search
CPC ..... H01M 2300/0082; H01M 10/0525; H01M 10/4235
See application file for complete search history.

(56) References Cited

U.S. PATENT DOCUMENTS 4,849,311 A * 7/1989 Itoh ...................... B01D 69/142
429/317
5,639,573 A * 6/1997 Oliver ............... H01M 10/0565
429/303

(Continued)

OTHER PUBLICATIONS

Stephan et al., "Chitin-Incorporated Poly(ethylene oxide)-Based Nanocomposite Electrolytes for Lithium Batteries," 2009, J. Phys. Chem., 113, 1963-1971. (Year: 2009).*

(Continued)

Primary Examiner — Ula C Ruddock
Assistant Examiner — Matthew W Van Oudenaren
(74) Attorney, Agent, or Firm — Hauptman Ham, LLP

(57) ABSTRACT

Ionically conductive materials that can be used in electrochemical generators. A new ionically conductive material usable in an electrochemical generator, for example in separators, solid polymer electrolytes or electrodes, has good mechanical properties and good ionic conductivity and is able to prevent dendritic growth in lithium batteries. The material comprises at least one polymer A, different from B, having an ionic conductivity of between $10^{-5}$ and $10^{-3}$ S/cm, at least one polymer B having mechanical strength charac- (Continued)

terised by a storage modulus ≥200 MPa and at least one reinforcing filler C.

19 Claims, 9 Drawing Sheets

(51) Int. Cl.
| | |
|---|---|
| *H01M 2/16* | (2006.01) |
| *H01M 50/403* | (2021.01) |
| *H01M 50/44* | (2021.01) |
| *H01M 50/411* | (2021.01) |
| *H01M 50/429* | (2021.01) |
| *B82Y 30/00* | (2011.01) |

(52) U.S. Cl.
CPC ..... *H01M 10/4235* (2013.01); *H01M 50/411* (2021.01); *H01M 50/4295* (2021.01); *H01M 50/44* (2021.01); *B82Y 30/00* (2013.01); *H01M 2300/0082* (2013.01)

(56) References Cited

U.S. PATENT DOCUMENTS

| | | | | |
|---|---|---|---|---|
| 2006/0102869 | A1* | 5/2006 | Cavaille | C08J 5/045 252/62.2 |
| 2012/0329894 | A1* | 12/2012 | Yamamoto | B29C 55/14 521/143 |
| 2013/0171498 | A1* | 7/2013 | Hsing | H01M 10/4235 429/145 |
| 2014/0227605 | A1* | 8/2014 | Nakamura | H01M 2/1653 429/254 |
| 2015/0020947 | A1* | 1/2015 | Stanga | C09D 127/16 156/60 |

OTHER PUBLICATIONS

Boor Singh Lalia et al., "Nanocrystalline cellulose-reinforced composite mats for lithium-ion batteries: electrochemical and thermomechanical performance," Journal of Solid State Electrochemistry, vol. 17, No. 3, Oct. 3, 2012, pp. 575-581.

Azizi Samir M.A.S. et al., "Cellulose nanocrystals reinforced poly(oxyethylene)," Polymer, Elsevier Science Publishers B.V., GB, vol. 45, No. 12, May 1, 2004, pp. 4149-4157.

My Ahmed Said Azizi Samir et al., "Cross-Linked Nanocomposite Polymer Electrolytes Reinforced With Cellulose Whiskers," Macromolecules, vol. 37, No. 13, Mar. 6, 2004, pp. 4839-4844.

International Search Report from corresponding International Application No. PCT/FR2017/051914, dated Sep. 19, 2017, pp. 1-2, European Patent Office, Rijswijk, The Netherlands.

* cited by examiner

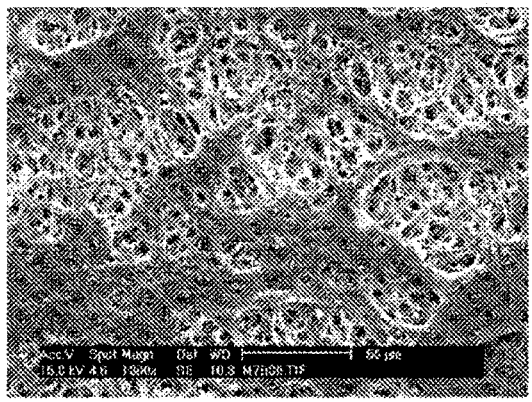
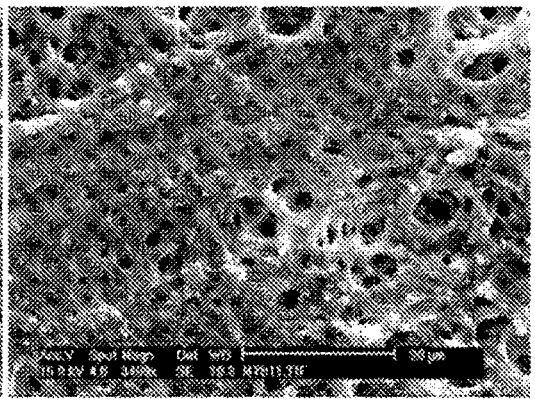
Figure 3A　　　　　　　　　　Figure 3B
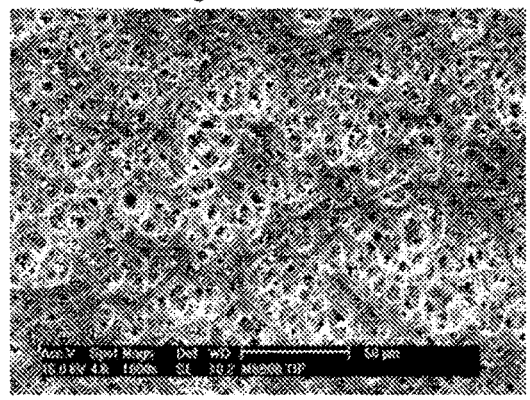
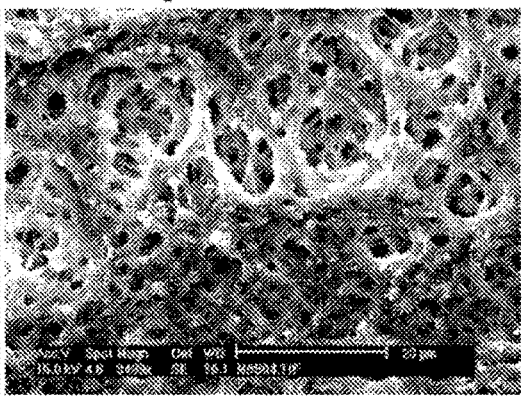
Figure 4A　　　　　　　　　　Figure 4B

IONICALLY CONDUCTIVE MATERIAL FOR ELECTROCHEMICAL GENERATOR AND PRODUCTION METHODS

FIELD OF THE INVENTION

The field of this invention is that of ionically conductive materials which can be used in electrochemical generators, for example in separators, solid polymer electrolytes or electrodes.

In particular, the present invention relates to an ionically conductive material comprising two polymers A and B, different from one another, and a reinforcing filler. The present invention also relates to films, in particular infiltrated films, based on this ionically conductive material and methods for producing these films.

TECHNOLOGICAL BACKGROUND

Electrochemical devices, like electrochemical generators which are cells and batteries, are all constructed according to the same model: a cathode (positive), an anode (negative), and, between the two, an electrolyte which makes it possible for the passage of ions but not the passage of electrons. Often, the electrolyte is constituted of salt(s) dissolved in a solvent or a mixture of aprotic polar solvents: these liquid electrolytes are commonly used in commercial batteries termed lithium-ion. Aprotic polar solvents can be partially or totally substituted by ionic liquids to decrease the inflammability of the electrolytes. The electrolyte being the component which is the most resistant to the battery, or more generally to the electrochemical generator, the thickness thereof should be drastically decreased.

With the electrodes of the electrochemical generators being very close, a separator is added between the anode and the cathode in order to avoid any contact between the two electrodes and thus prevent short-circuits. The separator is generally constituted of a porous material, of which the porosity is filled by the liquid electrolyte. The most used are microporous films of polyolefins based on polyethylene like Solupor®7P03A and Solupor®10P05A, or polypropylene like Celgard®2400. Other microporous separators, which associate 3 porous films of polypropylene/polyethylene/polypropylene, like Celgard®2325, can also be used, but the filling thereof by the liquid electrolyte is a lot slower. One of the disadvantages of all these separators, and particularly Celgard®2325, is that they highly decrease the conductivity of the electrolyte (D. Djian, F. Alloin, S. Martinet, H. Ligner, J-Y. Sanchez, J. Power Sources 172 (2007) 416).

In certain cases, the same material can ensure the separator and electrolyte function: it is the case of solid polymer electrolytes where the polymer itself acts as a macromolecular solvent, dissolving the salts, and ensuring the mobility of the ions. Thus, this is, for example, a film constituted of a polymer of the poly(oxyethylene) (POE or PEO) family, wherein a lithium salt has been dissolved (M. Gauthier, A. Bélanger, P. Bouchard, B. Kapfer, S. Ricard, G. Vassort, M. Armand, J-Y. Sanchez, L. Krause, Large lithium polymer battery development, The immobile solvent concept, J. Power Sources, 54 (1995) 163). These solid polymer electrolytes make it possible for the functioning of batteries between 60 and more than 100° C. but do not make it possible for the functioning thereof at ambient and sub-ambient temperature and, therefore, to meet the needs of portable electronics. They can, however, be impregnated with liquid solvents and/or ionic liquids to obtain a dense, inflated film by introducing said solvents which is a low-temperature conductor.

In electrochemical generators, like primary cells, batteries, supercapacitors or fuel cells, the separator filled with liquid electrolyte or solid polymer electrolyte, must be as thin as possible. This makes it possible to decrease the electrical resistance thereof which is proportional to the thickness and to improve the efficiency of the generator. However, it is also important that the separator or the solid polymer electrolyte is made from a material having good mechanical properties in order to prevent the risks of optimally short-circuiting.

In particular, in lithium batteries, it is important to have a separator or a solid polymer electrolyte made from a material having good mechanical properties. Indeed, in these batteries, dendritic growth phenomena can be produced. The dendritic growth appears during the recharging of the battery, the lithium thus forms balls or needles which can pass through the separator, which causes a short-circuit. This is a particularly dangerous failure mechanism which can lead to a fire. It is therefore paramount to prevent this phenomenon.

In order to improve the mechanical properties of materials used in separators and solid polymer electrolytes while making it possible to store a reasonable thickness of the latter, it has been proposed to add reinforcing fillers in these materials.

Patent application US2014/0227605 A1 discloses a polyolefin film comprising cellulose nanofibers. This reinforced film can be used as a separator.

However, these materials used in separators or solid polymer electrolytes are not perfect and there is always a demand for new materials having good mechanical properties and which prevent the dendritic growth.

OBJECTIVES

In this context, the present invention aims to satisfy at least one of the following objectives.

One of the main objectives of the invention is to provide an ionically conductive material which can be used in an electrochemical generator, for example in separators, solid polymer electrolytes or electrodes.

One of the main objectives of the invention is to provide an ionically conductive material having good mechanical properties.

One of the main objectives of the invention is to provide an ionically conductive material having a good ionic conductivity.

One of the main objectives of the invention is to provide an ionically conductive material which prevents the dendritic growth in lithium batteries.

One of the main objectives of the invention is to provide a mixed ionically/electronically conductive material having good ionic and electronic conductions and also having good mechanical properties.

One of the main objectives of the invention is to provide a film based on an ionically conductive material having all or some of the characteristics above.

One of the main objectives of the invention is to provide a method for producing a film based on an ionically conductive material having all or some of the characteristics above.

One of the main objectives of the invention is to provide a separator, a solid polymer electrolyte or an electrode based on an ionically conductive material having all or some of the characteristics above.

One of the main objectives of the invention is to provide an electrochemical generator comprising a separator, a solid polymer electrolyte or an electrode based on an ionically conductive material having all or some of the characteristics above.

BRIEF DESCRIPTION OF THE INVENTION

These objectives, among others, are achieved by the present invention which first and foremost relates to an ionically conductive material for an electrochemical generator characterised in that it comprises:

1. at least one polymer A, different from B, having an ionic conductivity of between $10^{-5}$ and $10^{-3}$ S/cm,
2. at least one polymer B having a mechanical strength characterised by a storage modulus $\geq 200$ MPa, for example of between 200 and 5000 MPa or of between 350 and 1500 MPa,
3. at least one reinforcing filler C.

Surprisingly, it has been discovered that such a material, i.e. comprising a mixture of two different polymers and of at least one reinforcing filler had both good mechanical properties and a good ionic conductivity. This type of material can therefore be used in electrochemical generators.

The invention also has the aim of films based on this type of material. These can be thin and store a good mechanical strength, they can therefore be used as a separator or solid polymer electrolyte in an electrochemical generator. In addition, surprisingly, it has been observed that these films prevent dendritic growth.

The invention also aims for an infiltrated film based on this type of material and three methods for the synthesis of these films.

The invention also relates to a separator, a solid polymer electrolyte or an electrode based on this ionically conductive material.

The invention also relates to an electrochemical generator, like a cell, a battery, a supercapacitors or an electrochromic glass comprising such an ionically conductive material.

BRIEF DESCRIPTION OF THE FIGURES

FIGS. 3A and 3B represent images under the SEM of a film according to the invention obtained according to example 3.

FIGS. 4A and 4B represent images under the SEM of a film according to the invention obtained according to example 4.

DETAILED DESCRIPTION OF THE INVENTION

Ionically Conductive Material

Figure 1A:
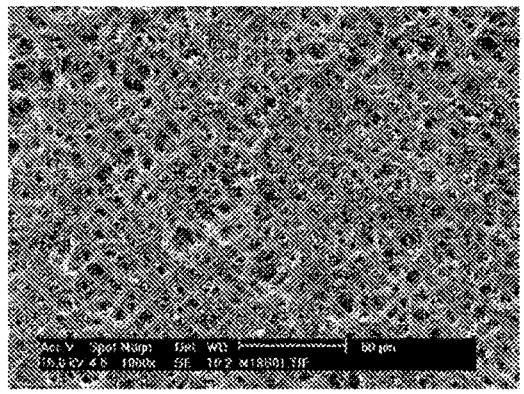
FIGS. 1A and 1B represent images under the scanning electron microscope, SEM, of a film according to example 1.
Figure 1B:
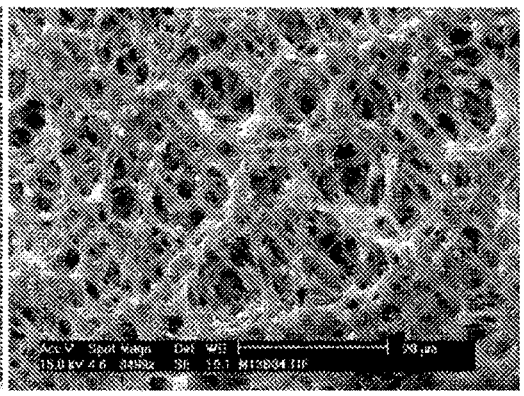
Figure 2A:
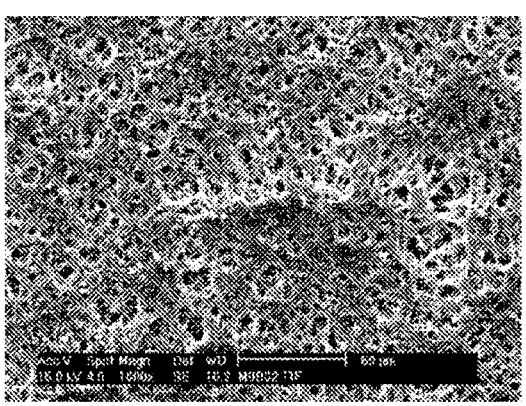
FIGS. 2A and 2B represent images under the SEM of a film according to the invention obtained according to example 2.
Figure 2B:
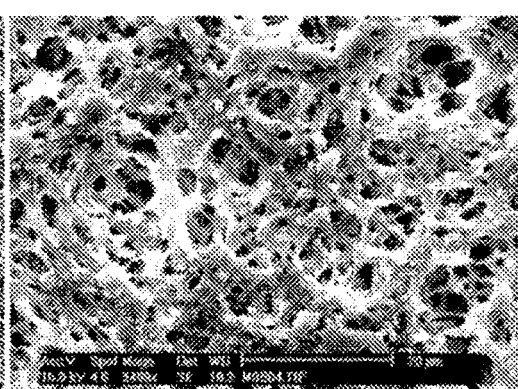

Below are detailed the preferred characteristics of the ionically conductive material 1-2-3 according to the invention.

Polymer A is a polymer having an ionic conductivity of between $10^{-5}$ and $10^{-3}$ S/cm. This conductivity is measured by electrochemical impedance spectrometry at ambient temperature.

For example, polymer A is selected from among polymers comprising an oxyalkylene chain in the main chain or in a pendant chain.

According to an embodiment of the invention, polymer A is a solvating polymer. By "solvating", this means, for example, able to dissolve one or more alkaline metal or alkaline earth salts, for example lithium, sodium, magnesium or calcium salt. For this, polymer A contains heteroatoms (N, O, S) and for example ether and/or amine-type bonds.

A solvating polymer is a polymer which comprises solvating units containing at least one heteroatom selected from among sulphur, oxygen, nitrogen and phosphorus.

According to an embodiment of the invention, polymer A is selected from among crosslinked or non-crosslinked solvating polymers, which possibly carry grafted ionic groups.

As examples of solvating polymers, the following can be cited:

homopolymers of polyether type selected from among poly(oxyethylene), poly(oxypropylene), poly(oxytrimethylenes) and poly(oxytetramethylenes), said homopolymers having a linear structure, a comb structure, a star structure or a dendrimer structure;

block copolymers or grafted copolymers of the polyether type, forming (or not) a network. Among these block copolymers, those can be cited, wherein certain blocks carry functions which have redox properties and/or certain blocks have crosslinkable groups and/or certain blocks have ionic functions;

statistical, random or alternate copolymers containing recurrent oxyalkylene units, forming (or not) a network. Among the oxyalkylene units, the oxyethylene unit, the oxypropylene, the 2-chloromethyloxyethylene unit and the oxyethyleneoxymethylene unit can be cited, which respectively come from the cycle opening of ethylene oxide, propylene oxide, epichlorohydrin and dioxolane and which are particularly preferred. Oxyalkenylene units can furthermore be cited which comes from the cycle opening of epoxyhexene, vinyl glycidyl ether, allyl glycidyl ether, glycidyl acrylate or glycidyl methacrylate;

polyphosphazenes, polysiloxanes, polyacrylates, polymethacrylates, polyacrylamides and polystyrenes which are carriers of oligoether ramifications;

linear polycondensates prepared, for example, by Williamson reaction between glycol polyethylenes and dichloromethane. Such polycondensates are described, in particular, by J. R. Craven et al MaKromol. Chem. Rapid Comm., 1986, 7, 81;

glycol polyethylene networks crosslinked by isocyanates or the networks obtained, prepared from polycondensates carrying crosslinkable groups, such as double or triple bonds, for example by a Williamson reaction with an unsaturated dihalide such as described by F. Alloin, et al., J. of Electrochem. Soc. 141, 7, 1915 (1994);

the networks prepared by glycol polyethylene reaction, modified by terminal amine functions, like commercial products Jeffamine@, and isocyanates, linear or ramified polyethyleneimines, as well as N-alkyl polyethyleneimines and the mixtures thereof.

For example, polymer A is selected from among poly (oxyethylene) and poly(meth)acrylates having oligo(oxyalkylene) chains.

Polymer B is a polymer having a good mechanical strength, it is characterised by a storage modulus ≥200 MPa, for example of between 200 and 5000 MPa or of between 350 and 1500 MPa. This storage modulus is measured by Dynamic Mechanical Analysis (DMA) at 30° C.

Polymer B can, for example, be selected from among semi-crystalline polymers of which the amorphous phase has a low glass-transition phase (for example, less than or equal to 20° C.) and a high melting temperature (for example, greater than or equal to 110° C.) like PVDF (polyvinylidene fluoride) and the copolymers thereof with hexafluoro propene (HFP) or chlorotrifluoroethylene (CTFE).

Polymer B can, for example, be selected from among semi-interpenetrated networks based on poly(oxyalkylene) (POE), of which the glass-transition temperature, Tg, is less than or equal to −50° C. (Tg≤223 K) and of which the melting temperature is greater than or equal to +65° C.

Polymer B can be selected from among ionic semi-crystalline polymers like carboxymethylcellulose (CMC) often used often as an electrode binder.

Polymer B can also be selected from among amorphous polymers having a glass-transition temperature greater than or equal to 110° C. As examples of such polymers, polyvinyl pyridine, polyindene, polycoumarone, polyacrylonitrile, polymethacrylonitrile, poly-α-methylstyrene, polycarbonates or PVP (polyvinyl-pyrrolidone) can be cited.

Polymer B can also be selected from among polymers termed high-performance, such as phenylene polyoxides, phenylene polysulphurs, polysulfones, polyether sulfones, polyamide-imides, in neutral or ionic form.

Polymer B can be a perfluorinated skeleton polymer carrying ionic groups like Nafion® ionomers produced by Dupont de Nemours or Aquivion® produced by Solvay in the form of the salts thereof.

According to an embodiment of the invention, polymer B is selected from among semi-crystalline polymers having an amorphous phase of between a low glass-transition temperature (for example, less than or equal to 20° C.) and a high melting temperature (for example, greater than or equal to 110° C.);

ionic semi-crystalline polymers;

amorphous polymers having a glass-transition temperature greater than or equal to 110° C.;

polymers termed high-performance, in neutral or ionic form;

and the mixtures thereof.

According to an embodiment of the invention, polymer B is selected from among fluoropolymers such as homopolymer and/or vinylidene fluoride copolymers (PVDF), hexafluoropropylene (HFP), tetrafluoroethylene (TFE) or chlorotrifluoroethylene (CTFE), said fluoropolymers could comprise ionic groups, like sulfonates, sulphonamides or sulfonyl imides, ammonium or phosphonium groups;

semi-crystalline polymers based on POE, of which the glass-transition temperature is less than or equal to −50° C. (Tg<223 K) and of which the melting temperature is greater than or equal to +65° C.;

polysulfones (PSu), comprising ionic groups (or not);

polyether sulfones (PES), comprising ionic groups (or not);

polyarylretherketones such as polyetheretherketone (PEEK), comprising ionic groups (or not);

polyimides (PI), fluorinated (or not), comprising ionic groups (or not);

polyamide-imides, comprising ionic groups (or not);

phenylene polysulfides, comprising ionic groups (or not);

polyarylethers like phenylene polyoxide, comprising ionic groups (or not);

polyolefins such as homopolymers and/or ethylene, propylene, styrene, N-vinyl-pyrrolidone, vinyl pyridine, indene, coumarone copolymers;

homopolymers and acrylonitrile copolymers (PAN);

homopolymers and methacrylonitrile copolymers, like polymethacrylonitrile;

polycarbonates, like vinylene polycarbonate;

and the mixtures thereof.

Preferably, polymer B is selected from among fluoropolymers, in particular polyvinylidene fluoride (PVDF) and the copolymers thereof, polysulfones (PSu), polyether sulfones (PES), polyetheretherketones (PEEK), polyimides (PI), and the mixtures thereof.

According to an embodiment of the invention, the polymer A/polymer B ratio is of between 95/5 and 5/95. For example, this ratio can be 95/5, 80/20, 75/25, 50/50, 25/75, 20/80 or 95/5.

The reinforcing filler C comprises a cellulosic material. Preferably, the reinforcing filler C comprises at least one nanocellulose. For example, the reinforcing filler comprises at least one nanocellulose and a material selected from among chitin, chitosan, gelatine, sericin and the mixtures thereof.

The reinforcing filler makes it possible to improve the mechanical properties of the ionically conductive material and therefore to decrease the thickness of the film and to improve the safety.

Nanocellulose is a cellulose having a nanostructure, i.e. having a structure of which at least one dimension is of between a few nanometres and 15-20 nanometres. There are three types of nanocellulose:

nanocrystalline cellulose, also called cellulose nanowhiskers or crystalline nanocellulose, which is found in the form of crystalline and rigid nanoparticles. This type of nanocellulose is obtained by acid hydrolysis of cellulose.

cellulose microfibrils, or cellulose nanofibrils, which are fibres of several micrometres in length and having a width of between 5 and 20 nanometres. These fibres are isolated from the cellulose by mechanical action.

bacterial nanocellulose, produced by bacteria.

According to an embodiment of the invention, the reinforcing filler is selected from among nanocrystalline cellulose and cellulose microfibrils.

According to an embodiment of the invention, the reinforcing filler is a mixture of two nanocelluloses, for example, a mixture of nanocrystalline cellulose and cellulose microfibrils.

According to an embodiment of the invention, the reinforcing filler is a mixture of nanocelluloses and chitosan.

According to an embodiment of the invention, the reinforcing filler is contained in the ionically conductive material at a concentration of between 0.5 and 30% by weight, preferably of between 2 and 20% and even more preferably of between 5 and 15%.

According to an embodiment of the invention, the ionically conductive material further comprises one or more conventional additives, for example mineral or organic fillers such as battery-grade silica.

According to an embodiment of the invention, the ionically conductive material further comprises at least one salt which makes it possible to ensure a better ionic conductivity, for example an alkaline or alkaline earth metal. In a particularly preferred manner, this is a lithium salt, preferably selected from among LiTFSI, $LiPF_6$, $LiBF_4$, $LiAsF_6$, $LiClO_4$, $LiCF_3SO_3$ and the mixtures thereof. This can also be a salt or another alkaline metal, such as sodium or an alkaline earth metal salt such as calcium or magnesium. In a particularly preferred manner, the salt is LiTFSI. The salt is contained in the ionically conductive material in a quantity such as the O/M ratio (M=metal) being of between 6 and 40, preferably of between 16 and 30. The O/M ratio is the ratio between the concentration in ether function of the material and the salt concentration. The ionically conductive material comprising a salt such as described above can be used as a solid polymer electrolyte.

According to an embodiment of the invention, the ionically conductive material also comprises at least one solvent, preferably aprotic polar or an ionic liquid which makes it possible to increase the low-temperature ionic conductivity. The organic solvent is selected from among solvents typically used in lithium batteries. This is, for example, fluorinated carbonates (or not), like ethylene carbonate, propylene carbonate, dimethyl carbonate, diethyl carbonate, ethyl methyl carbonate, or other solvents like 2-methyl THF or methyl acetamide. The ionic liquid is typically a tetraalkylammonium salt such as 1-butyl-1-methylpyrrolidiniun bis(trifluoromethane sulfonylimide).

According to an embodiment of the invention, the ionically conductive material further comprises at least one filler having an electronic conductivity. In this case, the material has a mixed ionic/electronic conduction. The filler having an electronic conductivity can be selected from among fibres or carbon powder, graphene, carbon nanotubes, acetylene black, graphite or graphitic material, and the mixtures thereof.

Film

The invention also aims for a film based on the ionically conductive material described above. The film is a thin layer of material comprising polymers A and B and the reinforcing filler C. It can be a simple mixture of polymers and the reinforcing filler, an infiltrated film comprising the reinforcing filler or an assembly of several layers of films according to the invention.

The present invention also aims for the use of this film to prevent the dendritic growth in batteries, in particular lithium or sodium batteries.

The film can have a thickness of between 10 and 300 µm, preferably of between 20 and 250 µm and better still of between 10 and 220 µm. Films having a thickness of between 10 and 20 µm can also be obtained. This relatively low thickness, the good mechanical properties of the material and the ionic conductivity thereof make it a good solid polymer electrolyte for an electrochemical generator, in particular for polymer lithium batteries functioning above 25° C. When this film further contains at least one solvent and/or an ionic liquid, the low-temperature conductivities thereof make it possible for the use thereof in portable electronic applications.

Infiltrated Film Obtained by Infiltration of a Porous Polymer

The present invention also aims for a film based on the ionically conductive material described above characterised in that it is an infiltrated film and in that polymer A is infiltrated in polymer B. This film is obtained by infiltration of a porous polymer. In this case, polymer B is a porous polymer of which polymer A fills the pores. It is also possible that polymer A, in addition to filling the pores of polymer B, forms a layer totally covering the layer of porous polymer B.

The reinforcing filler C can be comprised in the layer of porous polymer B and/or in the layer of polymer A. When the reinforcing filler C is contained in the layer of polymer A, this makes it possible to increase the mechanical strength thereof and to maintain this polymer in the pores of the layer of porous polymer B. When the mechanical strength of A is judged insufficient, polymer B can be mixed with the reinforcing filler resulting in a reinforcement which is maintained after the melting temperature of B, if this is semi-crystalline, or after the glass-transition temperature of B, if this is an amorphous polymer. The reinforcing filler C can also be included in both B and in A, which substantially consolidates it all. The layer of polymer A can also comprise at least one salt such as described above. This gives it all a good ionic conductivity. It is also possible to add to this infiltrated film, at least one solvent, preferably polar aprotic and/or an ionic liquid.

Polymer B is a porous polymer, it can be chosen from among the polymer B polymers above.

In particular, polymer B is selected from among semi-crystalline polymers such as:

polyethylene, polypropylene, ethylene and propylene copolymers, vinylidene homopolymer fluoride, PVDF, and the copolymers thereof like copolymers incorporating hexafluoro propene (HFP) and/or chlorotrifluoroethylene, CTFE, isotactic or syndiotactic polystyrene, polyether ketone, PEK, and polyetheretherketone, such as Victrex® PEEK, phenylene polysulfide, PPS, and the mixtures thereof;
or from among amorphous polymers at a high temperature of glass-transition, carriers (or not) of ionic functions, such as:
polyamide imides,
polyimides, PI, fluorinated (or not),
polysulfides, PSU,
polyether sulfones, PES,
polyarylethers like phenylene polyoxide, PPO
and the mixtures thereof.

According to an embodiment of the invention, when polymer A, in addition to filling the pores of polymer B, forms a layer totally covering the layer of polymer B, the layer of polymer B can further comprise at least one filler having an electronic conductivity. The filler having an electronic conductivity can be fibres or the carbon powder, graphene, carbon nanotubes, acetylene black, graphite or a graphitic material, or the mixtures thereof.

Film Comprising Several Layers

It is possible to superpose different films according to the invention according to the desired application.

For example, a film, with exclusively ionic conductivity, can be superposed with a mixed ionic/electronic conductive film as described above. This type of superposition can be used in batteries. In this case, the ionically conductive film must be directly in contact with either the anode, or with the cathode. The exclusively ionic conductive film thus interrupts the electronic conductive circuit, avoiding an accelerated self-discharging and the short-circuiting of the battery. This type of structure makes it possible to increase the thickness between the electrodes without almost increase the internal resistance, because of the electronic conductivity.

Figure 16:
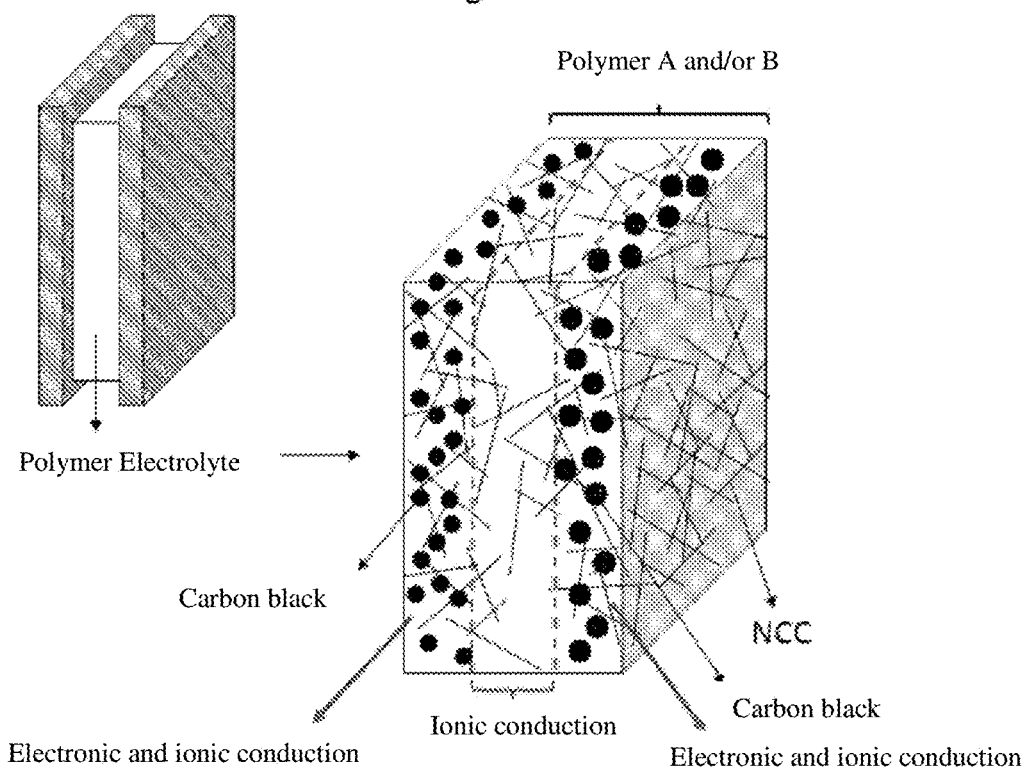
FIG. 16 represents a specific embodiment of a film made from three films according to the invention.

It is also possible to have a superposition of 3 layers of films, for example an exclusively ionic conductive film can be inserted between 2 mixed electronic/ionic conductive films. In the case of use in a battery, each of the 2 mixed electronic/ionic conductive films is in contact with the negative electrode (anode) or positive (cathode). An embodiment example is described in FIG. 16.

Preparation Methods

The present invention also aims for three methods for preparing a film such as described above: two methods for preparing a film based on a simple mixture of polymers and a method for preparing an infiltrated film obtained by infiltration of a porous polymer.

In the three methods, it is possible to increase the conductivity of the system by adding at least one solvent such as described above to the film obtained. This makes it possible to increase the low-temperature conductivity.

Method 1:

The infiltrated film is prepared according to method 1. This method comprises the following steps:
implementation of a layer of porous polymer B, possibly comprising a reinforcing filler C and/or a filler having an electronic conductivity;
infiltration of polymer A, or of the macromonomer able to form after polymerisation, polymer A, possibly with a reinforcing filler C and/or a salt and/or a polymerisation initiator, in the pores of polymer B;
possibly, polymerisation of the macromonomer able to form after polymerisation, polymer A.

The reinforcing filler can be comprised in the layer of porous polymer B and/or be introduced with polymer A.

The layer of porous polymer B forms a porous film B. The layer of porous polymer B can be a commercial porous film such as Solupor®. This layer of porous polymer B can also be prepared by techniques known to a person skilled in the art like electrospinning or phase inversion (Non-solvent Induced Phase Separation) such as described in the publication by Witte et al, *Journal of membrane science* 117, (1996), 1-31.

The infiltration step can be repeated several times according to the desired filling rate of the pores.

When the infiltration of polymer A is such that a layer of polymer A totally covers the porous film B, the latter can comprise a filler having an electronic conductivity such as described above. Polymer A totally covering polymer B, the electronic isolation is maintained and the infiltrated film obtained can, all the same, be used as a separator.

According to a first variant, the infiltration of polymer A in the pores of the porous film B can be done by making a solution containing polymer A pass through the porous film, the solution could possible contain a salt such as described above or a reinforcing filler C such as described above.

According to a second variant, the infiltration of polymer A in the pores of the porous film B is done by infiltrating, in the pores of the porous film B, at least one macromonomer able to form, after polymerisation, polymer A, then by inducing the polymerisation of these macromonomers in order to obtain polymer A. Preferably, the macromonomer is liquid and slightly viscous, which makes it possible to infiltrate the macromonomers without using any solvent. A polymerisation initiator is also infiltrated in the pores of the porous film, by dissolving it in the macromonomers. Among the polymerisation initiators, photoinitiators or thermal decomposition initiators can be cited, such as AIBN (Azobis isobutyronitrile) or BPO (benzoyl peroxide).

Preferably, the macromonomer able to form, after polymerisation, polymer A, is a (meth)acrylate with at least one oligo(oxyalkylene) chain.

Method 2:

The film comprising a simple mixture of polymers can be prepared according to method 2.

The method thus comprises the following steps:
preparing a mixture of polymer A, polymer B, reinforcing filler C, and possibly salt, in a solvent;
pouring this mixture on a support such as a glass plate, metal, or polymer, or also an electrode;
drying, for example, in a furnace or a heat chamber, possibly under a gas stream.
possibly crosslinking.

The crosslinking makes it possible to form a three-dimensional insoluble network, which improves the mechanical strength of the membrane. It can, in particular, be done by UV irradiation.

The pouring of the mixture directly on the electrode makes it possible to not remove the membrane from the support on which it has been poured.

The drying speed can be controlled in order to avoid cracks and residual stresses due to a too-quick drying.

According to an embodiment, the mixture of polymer A, of polymer B and of reinforcing filler C can comprise a salt such as described above. In this case, the reinforcing filler C is introduced as late as possible in order to avoid the aggregation thereof during contact with the salt.

Method 3:

The film comprising a simple mixture of polymers can be prepared according to method 3.

The method thus comprises the following steps:
preparing a mixture of polymer A, of polymer B, of reinforcing filler C, and possibly salt, in a solvent;
lyophilising the mixture obtained;
hot-pressing to obtain a film.

Hot-pressing makes it possible to obtain a semi-penetrated network film and to initiate the crosslinking if necessary.

According to an embodiment, the mixture of polymer A, of polymer B and of reinforcing filler C can comprise a salt such as described above. In this case, the reinforcing filler C is introduced as late as possible in order to avoid the aggregation thereof during contact with the salt.

Separator

The present invention also aims for a separator comprising an ionically conductive material such as described above. For example, the separator is a film based on the ionically conductive material such as described above. It can be a film based on a simple mixture of polymers and of reinforcing filler or of an infiltrated film comprising a reinforcing filler.

For example, the separator is a film comprising:
- at least one polymer A, different from B, having an ionic conductivity of between $10^{-5}$ and $10^{-3}$ S/cm,
- at least one polymer B having a mechanical strength characterised by a storage modulus ≥200 MPa, for example of between 200 and 5000 MPa or of between 350 and 1500 MPa,
- at least one reinforcing filler C, comprising at least one nanocellulose,
- at least one solvent, such as described above.

Typically, the separator has a thickness, advantageously of between 10 and 200 μm.

Solid Polymer Electrolyte

The present invention also aims for a solid polymer electrolyte comprising an ionically conductive material such as described above and at least one salt which makes it possible to ensure a better ionic conductivity. For example, the solid polymer electrolyte is a film based on the ionically conductive material such as described above. It can be a film comprising a simple mixture of polymers A & B and of the reinforcing filler C or of an infiltrated film.

For example, the solid polymer electrolyte is a film comprising:
- at least one polymer A, different from B, having an ionic conductivity of between $10^{-5}$ and $10^{-3}$ S/cm,
- at least one polymer B having a mechanical strength characterised by a storage modulus ≥200 MPa, for example of between 200 and 5000 MPa or of between 350 and 1500 MPa
- at least one reinforcing filler C, comprising at least one nanocellulose,
- at least one salt, such as described above, which makes it possible to ensure a better ionic conductivity.

Typically, the solid polymer electrolyte has a thickness of between 10 and 200 μm.

The salt which makes it possible to ensure a better ionic conductivity is, for example, a alkaline metal or alkaline earth salt. In a particularly preferred manner, the salt is a lithium salt, preferably selected from among LiTFSI, $LiPF_6$, $LiBF_4$, $LiAsF_6$, $LiClO_4$ and the mixtures thereof. It can also be a salt of another alkaline metal, such as sodium or a calcium or magnesium salt. In a particularly preferred manner, the salt is LiTFSI.

Electrode

The present invention also aims for an electrode, for example a cathode, comprising the ionically conductive material such as described above.

For example, the ionically conductive material is used as an electrode binder.

According to an embodiment, the electrode comprises:
- at least one polymer A, different from B, having an ionic conductivity of between $10^{-5}$ and $10^{-3}$ S/cm,
- at least one polymer B having a mechanical strength characterised by a storage modulus ≥200 MPa, for example of between 200 and 5000 MPa or between 350 and 1500 MPa,
- at least one reinforcing filler C comprising at least one nanocellulose,
- at least one filler having an electronic conductivity, for example selected from among fibres or the carbon powder, graphene, carbon nanotubes, acetylene black, graphite or a graphitic material, and the mixtures thereof,
- at least one active material such as, for example, LIP (Lithium Iron Phosphate) or $Li_xCoO_2$ (lithium cobalt oxide).

This type of electrode is particularly suitable for solid polymer electrolyte batteries.

Electrochemical Generator

The present invention also aims for an electrochemical generator comprising an ionically conductive material such as described above. According to an embodiment of the invention, the electrochemical generator is a call or a battery, for example a lithium battery, a supercapacitors or an electrochromic glass.

For example, the electrochemical generator comprises a separator, a solid polymer electrolyte or an electrode such as described above.

EXAMPLES

Equipment:

The films are prepared by using polyvinylidene fluoride (PVDF) having a molar mass of around 650000 g·mol$^{-1}$, of poly(ethylene glycol) methyl ether methacrylate (mono-PEGMA) having a molar mass of around 500 g·mol$^{-1}$, of poly(ethylene glycol) dimethacrylate (di-PEGMA) having a molar mass of around 550 g·mol$^{-1}$, of linear poly(oxyethylene) (POE) having a molar mass of around 300000 g·mol$^{-1}$, and of crosslinkable POE polycondensate, synthesised from polyethylene glycol.

The reinforcing filler used is nanocrystalline cellulose (NCC) or a mixture of NCC and chitosan. Except for indication on the contrary, the reinforcing filler percentages are expressed by mass with respect to the total mass of polymer used.

The films are subjected to a Dynamic Mechanical Analysis (DMA) in order to measure the mechanical properties thereof. These measurements are taken on a Q800 device of the brand TA.

Preparation of Infiltrated Films Based on Mono- and/or Di-PEGMA (Polymer A), on PVDF (Polymer B) and on NCC (Reinforcing Filler C) According to Method 1

Example 1 (Comparative Example): Synthesis of a PVDF Film Containing 7% by Mass of NCC 2.3 g of PVDF are weighed in a 40 mL container and 14 mL of N,N-Dimethylformamide (DMF) are added. The mixture is stirred at 50° C. until complete dissolution. A dispersion of NCC at 4% in the DMF is prepared by mixing 6 g of NCC in 150 mL of DMF using a ultra-turrax type, high-power homogeniser. 4.4 mL of this dispersion (that is 0.18 g of NCC) are then added to the PVDF solution and the mixture is stirred vigorously. The mixture is then poured onto a glass plate by using a 'coating' 'doctor blade' ®-type machine to achieve a thickness of 0.8 mm. It all is then immersed in ethanol for 15 minutes in order to create the porosity by Non-solvent Induced Phase Separation (NIPS, Witte et al, *Journal of membrane science* 117, (1996), 1-31). The 'glass plate+film' unit is then removed from the ethanol bath and is brought to the heat chamber. The film is dried under vacuum at 60° C. for at least 50 hours, then easily removed using tongs and spatula before being stored. The microporous film obtained has a thickness of around 90 microns.

Example 2: Synthesis of a PVDF Film Containing 7% by Mass of NCC Infiltrated by Mono-PEGMA 1.0 g of mono-PEGMA and 50 mg of benzoyl peroxide are weighed in a 20 mL container.

A square of 6×6 cm of a microporous PVDF film and containing 7% by mass of NCC prepared according to example 1 is disconnected and deposited on a frit glass. The preparation of mono-PEGMA is then poured drop by drop using a Pasteur pipette on all of the surface of the film and infiltrated through the porosity of the film using a gap obtained by an aspirator. The infiltrated film is then brought to 80° C. over 24 hours in a heat chamber. A post-cross-linking at 110° C. for 2 hours and at 130° C. for 2 hours is then carried out.

Example 3: Synthesis of a PVDF Film Containing 7% by Mass of NCC Infiltrated by Di-PEGMA A PVDF film containing 7% by mass of NCC and infiltrated by di-PEGMA has been obtained according to the working method described in example 2 by using 1.0 g of di-PEGMA instead of mono-PEGMA.

Example 4: Synthesis of a PVDF Film Containing 7% by Mass of NCC Infiltrated by a Mixture of Mono- and Di-PEGMA A PVDF film containing 7% by mass of NCC infiltrated by a mixture of mono- and di-PEGMA has been obtained according to the working method described in example 2 by using 0.5 g of mono-PEGMA and 0.5 g of di-PEGMA instead of 1.0 g of mono-PEGMA.

Characterisation of the Infiltration Method

The films prepared according to examples 2 to 4 have been weighed before and after infiltration in order to quantify the mass increase of the films. Table 1 summarises the results obtained. This data shows that there is an infiltration of PEGMA-type polymers in the PVDF film containing 7% by mass of NCC.

TABLE 1

Mass increase of the films

| | PVDF NCC | | | |
|---|---|---|---|---|
| | initial m | final m | infiltrated m | Mass increase |
| Example 2 | 0.5589 g | 0.6841 g | 0.1252 g | 22% |
| Example 3 | 0.4993 g | 0.6041 g | 0.1048 g | 21% |
| Example 4 | 0.5193 g | 0.6095 g | 0.0902 g | 17% |

Characterisation of the Morphology of the Infiltrated Films

The morphology of the different films prepared according to examples 1 to 4 has been characterised by scanning electron microscopy (SEM, Philips XL-30). A sample of each film (0.5×0.5 mm) is secured on a support with a conductive carbon adhesive and the surface area of the sample is then metallised with gold. A voltage of 15 kV is applied and the images are obtained at different magnifications. The two faces of each film have been observed without noting notable differences.

FIGS. 1 to 4 represent the images obtained for different films. These images show that the films infiltrated by di-PEGMA and the mixture of mono- and di-PEGMA have a porosity less than that of the film infiltrated by mono-PEGMA. All of the infiltrated films are less porous than the original microporous PVDF film reinforced by 7% of NCC. This confirms that the infiltration method is effective.

Mechanical Characterisation by DMA

The films prepared according to examples 1 to 4 are characterised between −100° C. and +180° C. The samples are rectangular films having dimensions close to 14 mm×6.5 mm×0.1 mm (L×l×e). The samples are cooled down to −100° C., then the films are heated at a speed of 2° C./min up to 180° C. by subjecting a deformation of 0.05% to a frequency of 1 Hz.

Figure 5:
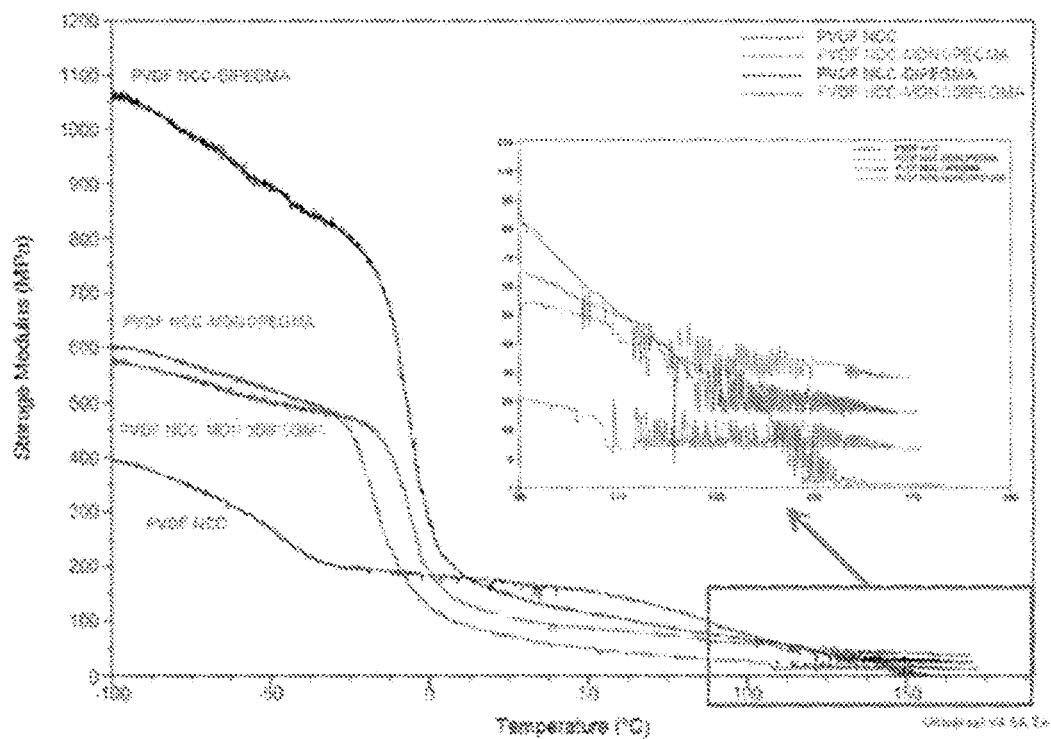
FIG. 5 represents mechanical characterisation curves by DMA of the films according to examples 1 to 4.

FIG. 5 represents the variation in the value of the storage modulus according to the temperature for these four films.

These curves show that at a low temperature, the infiltration of the films by different PEGMAs contributes to increasing the value of the Storage Modulus: +50% to −100° C. for the film infiltrated by mono-PEGMA according to example 2 and for the film infiltrated by a mixture of mono- and di-PEGMA according to example 4. Concerning the film infiltrated by di-PEGMA according to example 3, the storage modulus is almost tripled to −100° C.

The zoom shows that beyond 120 to 130° C., the mechanical strength of the infiltrated films according to examples 2 to 4 is considerable improved with respect to the non-infiltrated film according to example 1. This is a safety guarantee in case of a highly exothermic malfunction of the battery.

Mechanical Characterisation by Traction Testing

Figure 6:
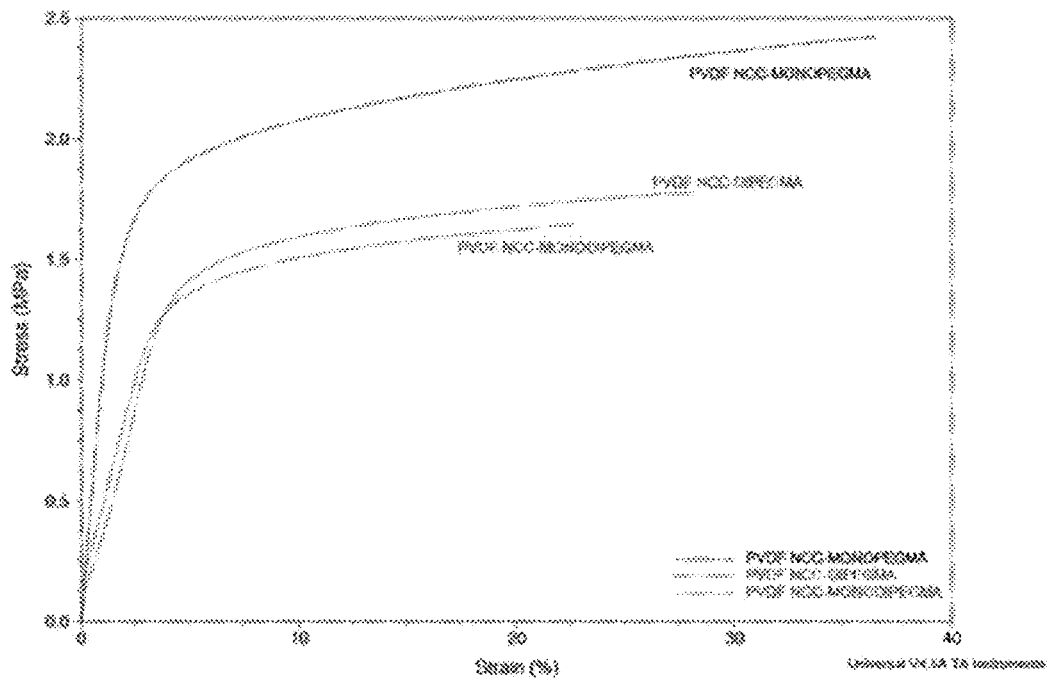
FIG. 6 represents the curves obtained during the characterisation by traction testing films 2 to 4.

The films according to examples 2 to 4 have then been characterised by carrying out traction tests at 30° C. with an extending speed of 0.1N/min. The samples are rectangular films having dimensions close to 12 mm×6 mm×0.1 mm FIG. 6 represents the curves obtained. The results are comparable to those obtained with PVDF films reinforced by non-infiltrated NCCs such as described in example 1.

Conductivity Measurements

The measurements are taken with a Solartron 1287-1260 impedancemeter, coupled with a computer to process data, in the frequency range 0.1 Hz-10 MHz, the amplitude of the sinusoidal signal is set to +/−100 mV.

The samples of infiltrated films according to examples 2 to 4 are immersed for 25 minutes in a Lithium hexafluorophosphate solution (LP 30 of Sigma Aldrich, mixture of ethylene carbonate and dimethyl carbonate−EC/DMC=50/50 (v/v)—with 1.0M of LiPF6) then are mounted in Swagelok cells.

Each measurement has been taken twice to ensure the repeatability of the determined conductivities. The conductivity values obtained at 25° C. are summarised in table 2.

TABLE 2

| | conductivity measurements |
|---|---|
| | σ (mS/cm) |
| Example 2 | 6.7 |
| Example 3 | 2.9 |
| Example 4 | 3.4 |

Typically, a microporous PVDF film reinforced with 6% of NCC has a conductivity of 2.5 mS/cm at 25° C. after having been submerged in LP30. These results show that the infiltrated films have a better conductivity.

Preparation of Reinforced Films According to Method 2

The films contain a quantity of LiTFSI ($(CF_3SO_2)_2NLi$) salt such that the O/Li ratio is 25.

Preparation of Reinforced Films Based on POE (Polymer A), PVDF (Polymer B) and NCC (Reinforcing Filler C).

Example 5: Synthesis of a POE/PVDV (50/50) Film with 7% of NCC 1.0 g of POE, 1.0 g of PVDF and 0.26 g of LiTFSI are weighed in a 60 mL container and 20 mL of DMF are added. The mixture is stirred at 60° C. until complete dissolution. A dispersion of NCC at 4% in the DMF is prepared by mixing 6 g of NCC in 150 mL of DMF using an ultra-turrax high-power homogeniser. 3.77 mL of this dispersion (that is 0.15 g of NCC) are then added to the polymer solution and the mixture is stirred vigorously at 70° C. using a mechanical stirrer for ten minutes then deaerated, to avoid the formation of bubbles, using a pump.

The mixture is then poured with a 'coating' 'doctor blade'-type machine to achieve a thickness of 1.5 mm on a glass plate. The 'glass plate+film' unit is thus brought to the heat chamber. The films are dried under vacuum at 60° C. for at least 50 hours then carefully removed using tongs and spatula before being stored. A control of the total removal of the DMF is carried out by Infrared spectroscopy. The film obtained has a thickness of around 200 μm. This thickness makes it possible for reliable mechanical measurements.

Example 6: Synthesis of a POE/PVDF (80/20) Film Containing 7% of NCC

A POE/PVDF 80/20 film has been obtained according to the working method described in example 5 by using 1.6 g of POE, 0.4 g of PVDF, 0.42 g of LiTFSI and 21 mL of DMF.

Example 7: Synthesis of a POE/PVDF (90/10) Film Containing 7% of NCC

A POE/PVDF 90/10 film has been obtained according to the working method described in example 5 by using 1.8 g of POE, 0.2 g of PVDF, 0.47 g of LiTFSI and 22 mL of DMF.

Example 8 (Comparative Example): Synthesis of a POE/PVDF (80/20) Film Containing 0% of NCC A POE/PVDF 80/20 film has been obtained according to the working method described in example 6 by not using any NCC.

Example 9 (Comparative Example): Synthesis of a POE/PVDF (90/10) Film Containing 0% of NCC A POE/PVDF 90/10 film has been obtained according to the working method described in example 7 by not using any NCC.

Thermal Characterisation

Figure 7:
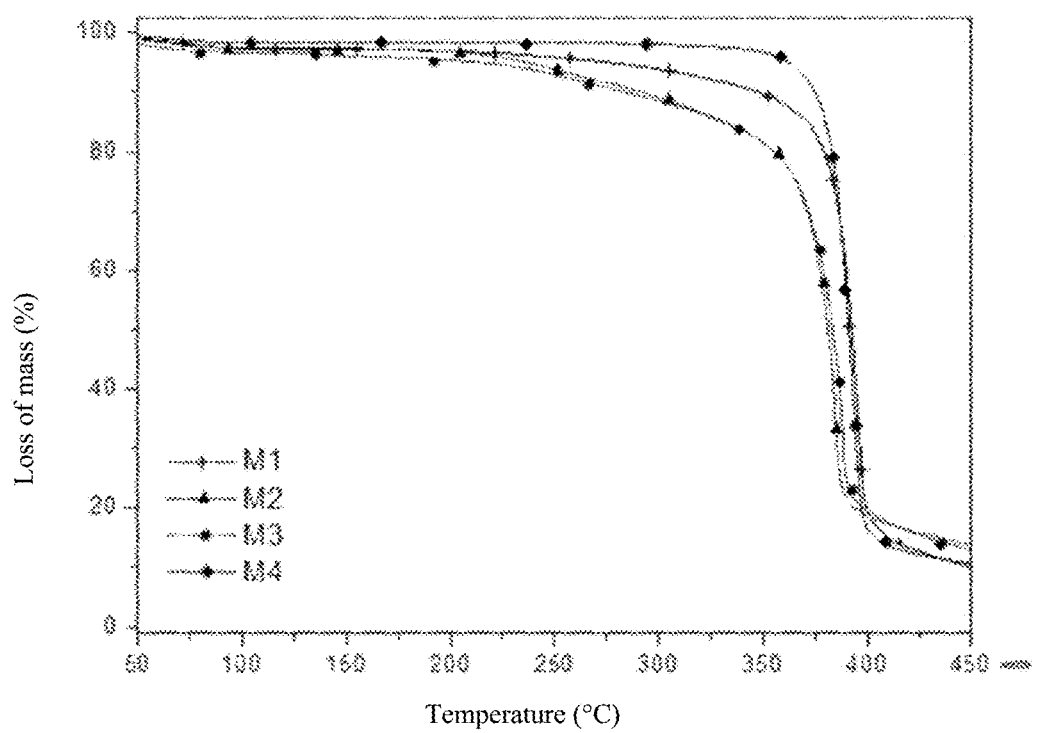
FIG. 7 represents the curves obtained during thermal characterisation, by thermogravimetric analysis (TGA), films according to examples 6 to 9 with the curve M1 representing example 7, the curve M2 example 6, the curve M3 example 8 and the curve M4 example 9.
Figure 8A:
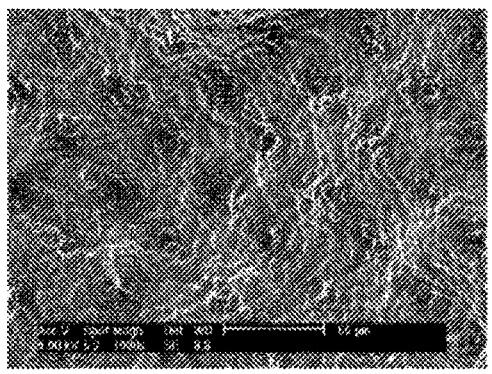
FIG. 8A represents the image under the SEM of a film obtained according to example 7.
Figure 8B:
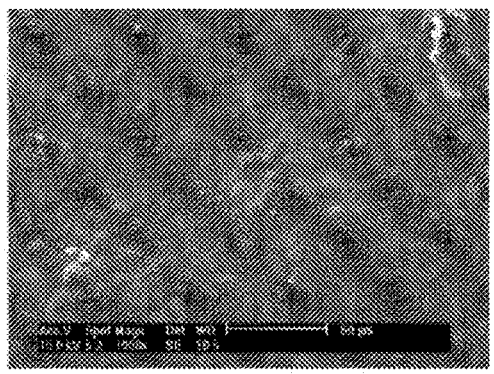
FIG. 8B represents the image under the SEM of a film obtained according to example 6.
Figure 8C:
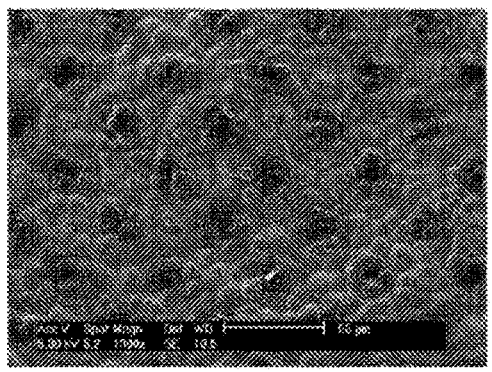
FIG. 8C represents the image under the SEM of a film obtained according to example 8.
Figure 8D:
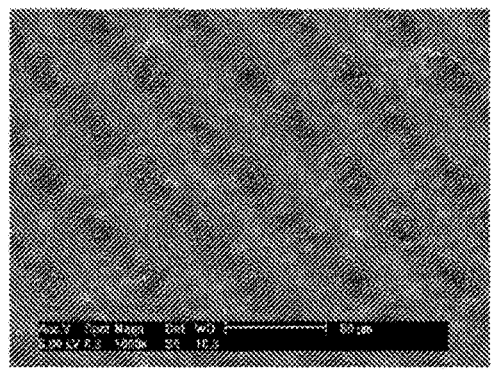
FIG. 8D represents the image under the SEM of a film obtained according to example 9.

The thermal degradation of the films according to examples 6 to 9 has been measured by thermogravimetric analysis with a Perkin Elmer Pyris 1 TGA under oxidising atmosphere (air). The loss of mass of a 10 mg sample has been recorded from the ambient temperature up to 450° C. with a heating speed of 10° C./min FIG. 7 represents the results obtained. These results show that:

- films containing 20% of PVDF (M2 and M3) initiate a first loss of mass around 200° C. which is slightly less pronounced in the presence of cellulose (M2). For these films, a second loss of mass is observed around 400° C.;
- films containing 10% of PVDF (M1 and M4) initiate a sudden and high loss of mass around 400° C.;
- from 400° C., films containing 20% of PVDF (M2 and M3) experience a less significant and more gradual loss of mass than the membranes containing 10% of PVDF (M1 and M4).

The films according to examples 6 to 9 have a thermal stability up to 200° C., which is greater than the maximum temperature in the batteries (around 100° C.).

Calorimetric Characterisation

The calorimetric analysis of the films according to examples 6 to 9 has been carried out with a DSC Mettler Toledo 822 under a nitrogen atmosphere. The heat stream of a 10 mg sample has been recorded during a cooling and heating ramp at the speed of 10° C./min between −70° C. and 200° C.

The calorimetric parameters are summarised in table 3.

TABLE 3

| | calorimetric measurements | | | | |
|---|---|---|---|---|---|
| | cooling | | heating | | |
| | POE crystallisation Tmax (° C.)/ ΔHc (J/g) | PVDF crystallisation Tmax (° C.)/ ΔHc (J/g) | Tg (° C.) | fusion POE Tmax (° C.)/ ΔHc (J/g) | fusion PVDF Tmax (°C)/ ΔHc (J/g) |
| NCC-POE/PVDF (90/10) | 26/59.9 | 102/4.3 | −33.9 | 56/62.9 | 147-155/1.2 |
| NCC-POE/PVDF (80/20) | 21/50.8 | 114/8.1 | −33.8 | 55/55.2 | 152/4.9 |
| POE/PVDF (80/20) | 26/53.9 | 111-119/8.1 | −35.7 | 51/57.7 | 150/3.9 |
| POE/PVDF (90/10) | 24/63.5 | 105/3.4 | −35.5 | 53/67.6 | 149-156/1.6 |

From this analysis, the following can be observed:
- the addition of NCC leads to a very slight decrease of Tg independently of the PVDF percentage, which is situated in the margin of measurement uncertainty,
- the addition of NCC slightly modifies the crystallisation and the melting of the PVDF and of the POE, although no trend can be detected between the different samples.

Characterisation of the Morphology of the Films Obtained

The morphology of the films according to examples 6 to 9 has been characterised by scanning electron microscopy (SEM, Philips XL-30). A sample of each film (0.5×0.5 mm) is secured on a support with a conductive carbon adhesive and the surface area of the sample is then metallised with gold. A voltage of 15 or 5 kV is applied and the images are obtained at different magnifications. The two faces of each membrane have been observed without noting notable differences.

FIG. 8 represents the photos obtained. It can be observed visually, that all the films have a "grainy" morphology. The PVDF nodules within the POE confirm the phase separation between the PVDF and the POE. The two phases are continuous, they constitute two three-dimensional structures overlapping one another. The membranes containing 20% of PVDF (M2 and M3) have a lot more defined areas of PVDF. It is not possible to establish morphological differences when the NCC is incorporated.

Mechanical Characterisation by Traction Testing

Figure 9:
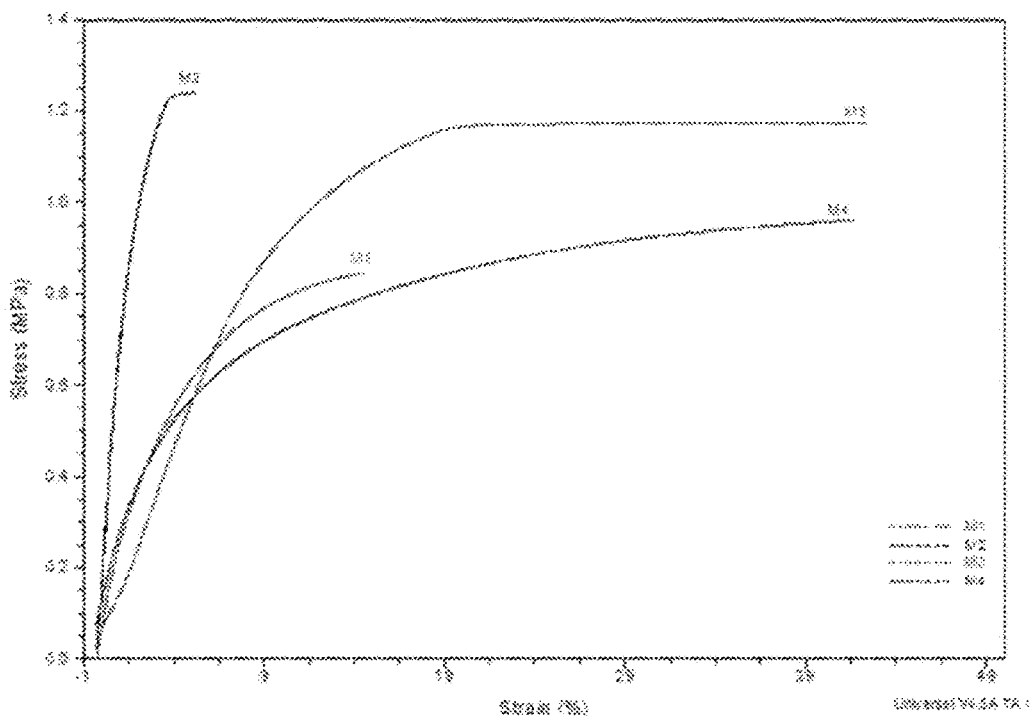
FIG. 9 represents the mechanical characterisation curves extended from the films according to examples 6 to 9 with the curve M1 representing example 7, the curve M2 example 6, the curve M3 example 8 and the curve M4 example 9.

The films have been characterised with DMA TA Q800 by carrying out traction tests at 30° C. with an extending speed of 0.1N/min. The samples are rectangular films having dimensions close to 12×6×0.1 mm FIG. 9 represents the results obtained. From this analysis, it can be observed that the addition of NCC contributes to modifying the mechanical properties. Independently of the PVDF percentage, the NCC leads to an increase of the Young modulus and a decrease of the deformation to the rupture. A higher percentage of PVDF improves the mechanical strength.

Conductivity Measurements

The films according to examples 6 to 9 have been synthesised by adding a lithium salt (LiTFSI). The molar concentration in lithium salt, expressed as a number of oxygen atoms (O) of the POE polymer with respect to the number of lithium cations (Lit) of the lithium salt, is O/Li=25 in the four cases. This concentration is usual in literature, as it makes it possible to obtain good functioning performances. The films thus obtained have been characterised in symmetrical cells, i.e. between two identical metal lithium electrodes. The assembly of the cells has been done in a glove box under an argon atmosphere (humidity less than 5 ppm, oxygen less than 5 ppm) in order to not degrade the lithium and to not re-humidify the films. The assemblies are then sealed in laminated aluminium pouches to remain sealed to ambient air, and installed in a temperature-controlled chamber to proceed with the conductivity measurements at different temperatures.

The conductivity measurement is taken by electrochemical impedance spectroscopy, on a VMP-300 potentiostat of the brand BioLogic. The measurements are taken during the fall in temperature (between 84° C., that is 1000/T=2.8; and 21° C., that is 1000/T=3.4). If the cell no longer runs below a certain temperature, no measurement is noted.

The electrochemical impedance spectroscopy is carried out after stabilisation of the temperature and the electrolyte resistance value of the membrane. A frequency scanning between 1 MHz and 1 Hz with a potential amplitude suitable for the sample (between 30 and 100 mV) is carried out. The representation of the current value on an Nyquist graph makes it possible to determine the electrolyte resistance value (the electrolyte being, in this case, the film), which then makes it possible to calculate the conductivity of the sample with the following formula:

$$\sigma = \frac{e}{R \times S}$$

With $\sigma$ the conductivity of the cell expressed in $S \cdot cm^{-1}$, e the thickness of the electrolyte (in cm), R the resistance of the electrolyte (measured by the electrochemical impedance spectroscopy, expressed in Ohms), and S the surface of the sample in $cm^2$.

Figure 10:
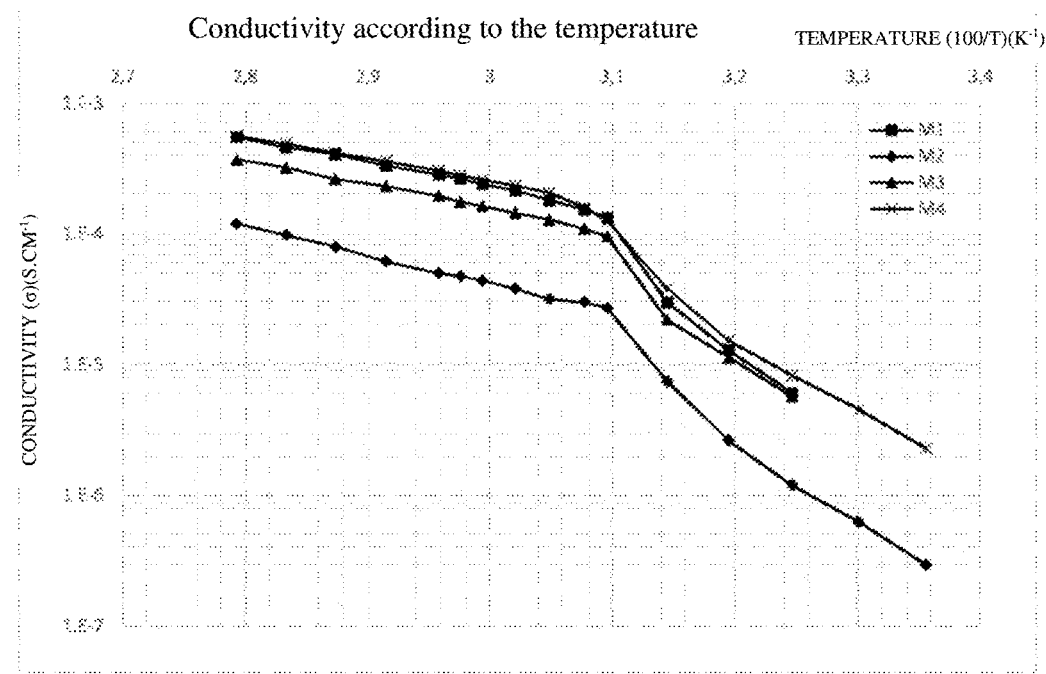
FIG. 10 represents the measurements of conductivities of films according to examples 6 to 9 with the curve M1 representing example 7, the curve M2 example 6, the curve M3 example 8 and the curve M4 example 9.

FIG. 10 represents the results obtained.

It can be observed that in the case of films according to examples 6 and 8, each containing 20% of PVDF, the conductivity values measured are less than those of the films according to examples 7 and 9 which only contain 10% of PVDF.

In addition, for membranes containing 20% of PVDF, adding 7% of NCC leads to a fall in conductivity values, by a factor 3 at 85° C.

However, for films according to examples 7 and 9 containing 10% of PVDF, adding 7% of NCC (film according to example 7) does not lead to any notable decrease in conductivity. Therefore, the film is reinforced without affecting the conductivity with a PVDF rate of 10%;

The conductivity values slightly decrease down to 1000/T=3.1 that is T=50° C., value at which the POE of the membrane crystallises. This value is between the DSC values measured by heating and by cooling, as here the time is left for the POE to crystallise, while the DSC was achieved in a dynamic regime (10° C./min).

Below 50° C., the conductivity values fall more quickly as the electrolyte is thus sold.

Preparation of Reinforced Films Based on Crosslinkable POE Polycondensate (PC) (Polymer A), POE (Polymer B) and NCC (Reinforcing Filler C).

Example 10: Synthesis of the Crosslinkable POE Polycondensate (PC1000)

In a reactor, 30 g (30 mmol) of polyethylene glycol 1000 (PEG1000) are mixed with 4.9 g (120 mmol) of NaOH. The mixture is stirred using a mechanical stirrer for 3 hours at 65° C. The temperature is lowered to 50° C. then 3.48 mL (29.4 mmol) of 3-chloro-2-chloroprop-1-ene are added drop by drop. The stirring is followed for 24 hours at 50° C. and a paste is obtained.

Water is added to solubilise the polymer then the solution is decanted into an Erlenmeyer and diluted with water up to 600 mL. Acetic acid is added progressively until the solution has a pH of 7 (control with pH paper). The product is purified by ultrafiltration with a disconnection threshold of 3000 $g \cdot mol^{-1}$ in order to remove the oligomers, the $CH_3COONa$ salt formed and the excess NaOH. When the conductivity of the filtrate is close to that of deionised water (10 $\mu S \cdot cm^{-1}$), the ultrafiltration is finished.

The solid is lyophilised and the product is obtained in the form of a white solid.

Example 11: Synthesis of a POE/NPC1000 (50/50) Film Containing 10% of NCC

In a 30 ml container, in 10 ml of distilled water, 0.20 g of POE, 0.11 g of LiTFSI and 0.20 g of PC1000 obtained according to example 10 is dissolved. Then, 0.0040 g of Irgacure 2959 photoinitiator and finally 1 mL of dispersion of NCC at 4% are added in the water. The mixture is stirred for 12 hours. The air bubbles are removed using a pump and the solution is poured into a Petri dish of diameter 9 cm. When the solvent is evaporated, the film is crosslinked under UV by exposing it under the lamp for one minute (2×30 seconds) with one minute of waiting time between the first and the second exposure to UV. From the crosslinking, PC1000 transforms a three-dimensional network NPC 1000 and forms, with the POE homopolymer, a semi-interpenetrated POE/NPC1000 network. In the following examples of 12 to 21 inclusive, these semi-interpreted networks are formed from the UV crosslinking.

The films are dried under vacuum at 70° C. for at least 72 hours and stored in the glove box.

Example 12: Synthesis of a POE/NPC1000 (75/25) Film Containing 10% of NCC

A POE/NPC1000 (75/25) film containing 10% of NCC has been obtained according to the working method described in example 11 by using 0.30 g of POE, 0.10 g of PC 1000 and 0.0020 g of Iragcure 2959.

Example 13: Synthesis of a POE/NPC1000 (25/75) Film Containing 10% of NCC

A POE/NPC1000 (25/75) film containing 10% of NCC has been obtained according to the working method described in example 11 by using 0.10 g of POE, 0.30 g of PC 1000 and 0.0060 g of Iragcure 2959.

Example 14: Synthesis of a POE/NPC1000 (75/25) Film Containing 6% of NCC

A POE/NPC1000 (75/25) film containing 6% of NCC is obtained according to the working method described in example 12 by using 6 mL of dispersion at 4% of NCC, that is 0.024 g of NCC.

Example 15: Synthesis of a POE/NPC1000 (75/25) Film Containing 12% of NCC

A POE/NPC1000 (75/25) film containing 12% of NCC is obtained according to the working method described in example 12 by using 0.048 g of NCC.

Example 16 (Comparative Example): Synthesis of a POE/NPC1000 (75/25) Film with 0% of NCC A POE/NPC1000 (75/25) film without NCC is obtained according to the working method described in example 12 by not using any NCC.

Example 17: Synthesis of a POE/NPC1000 (50/50) Film Containing 6% of NCC

A POE/NPC1000 (50/50) film containing 6% of NCC is obtained according to the working method described in example 11 by using 0.024 g of NCC.

Example 18: Synthesis of a POE/NPC1000 (25/75) Film Containing 6% of NCC

A POE/NPC1000 (25/75) film containing 6% of NCC is obtained according to the working method described in example 13 by using 0.024 g of NCC.

Example 19: Synthesis of a POE/NPC1000 (25/75) Film Containing 12% of NCC

A POE/NPC1000 (25/75) film containing 12% of NCC is obtained according to the working method described in example 13 by using 0.048 g of NCC.

Example 20 (Comparative Example): Synthesis of a POE/NPC1000 (50/50) Film with 0% of NCC A POE/NPC1000 (50/50) film without NCC is obtained according to the working method described in example 11 by not using any NCC.

Example 21: Synthesis of a POE/NPC1000 (50/50) Film Containing 12% of NCC

A POE/PC1000 (50/50) film containing 12% of NCC is obtained according to the working method described in example 11 by using 0.048 g of NCC.

Mechanical Characterisation by DMA

The films according to examples 14, 15 and 16 are characterised between −100° C. and +100° C. The samples are rectangular films having dimensions close to 15 mm×6 mm×0.150 mm (L×l×e). The samples are cooled down to −100° C. then the films are heated at a speed of 3° C./minute up to 100° C. by subjecting a deformation of 0.05% to a frequency of 1 Hz.

Figure 11:
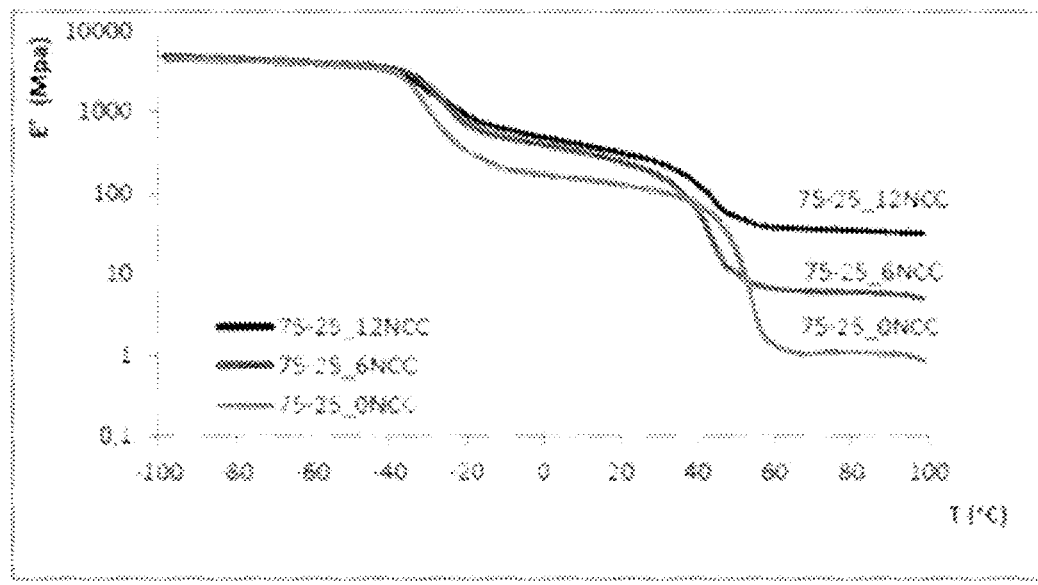
FIG. 11 represents the mechanical characterisation curves by DMA of the films according to examples 14 to 16.

The results obtained are presented in FIG. 11. These results show that the films have a storage modulus value E' of 6000 MPa to −100° C. At the glass-transition temperature, all the films see the storage modulus thereof fall: down to 100 MPa for the non-reinforced film according to example 16, and down to 300 MPa for the two reinforced films. It must be noted that at this stage, where the polymers are not still melted, not many differences are notable between the sample containing 6% (film according to example 14) and that containing 12% of NCC (film according to example 15). At the melting temperature of the POE, that is 43° C., the storage moduli again fall: down to 1 MPa for the non-reinforced film, and 8 Mpa for the reinforced film using 6% of NCC, and 70 MPa for the film containing 12% of NCC.

The reinforcement brought by the NCCs is therefore respectively 8 times for the film at 6% (film according to example 14) and 70 times for the film at 12% (film according to example 15).

Conductivity Measurements

The conductivity measurements are taken with a Hewlett Packard 4192A impedancemeter, coupled with a computer to process data, in the frequency range 5 Hz-13 MHz, the amplitude of the sinusoidal signal is set at +/−10 mV. The samples are mounted in a glove box under argon in Swagelok cells.

Conductivity measurements have been taken on films according to examples 14, 17 and 18 in order to study the effect of the polymer A/polymer B ratio on the conductivity. The measurements are taken by increasing and decreasing the temperature from 20° C. to 90° C. The measurement is taken every 10° C. after a stabilisation in temperature for 1 hour. The conductivities have been taken at the time of the fall in temperature. Each measurement has been taken twice to ensure the repeatability of the determined conductivities.

Figure 12:
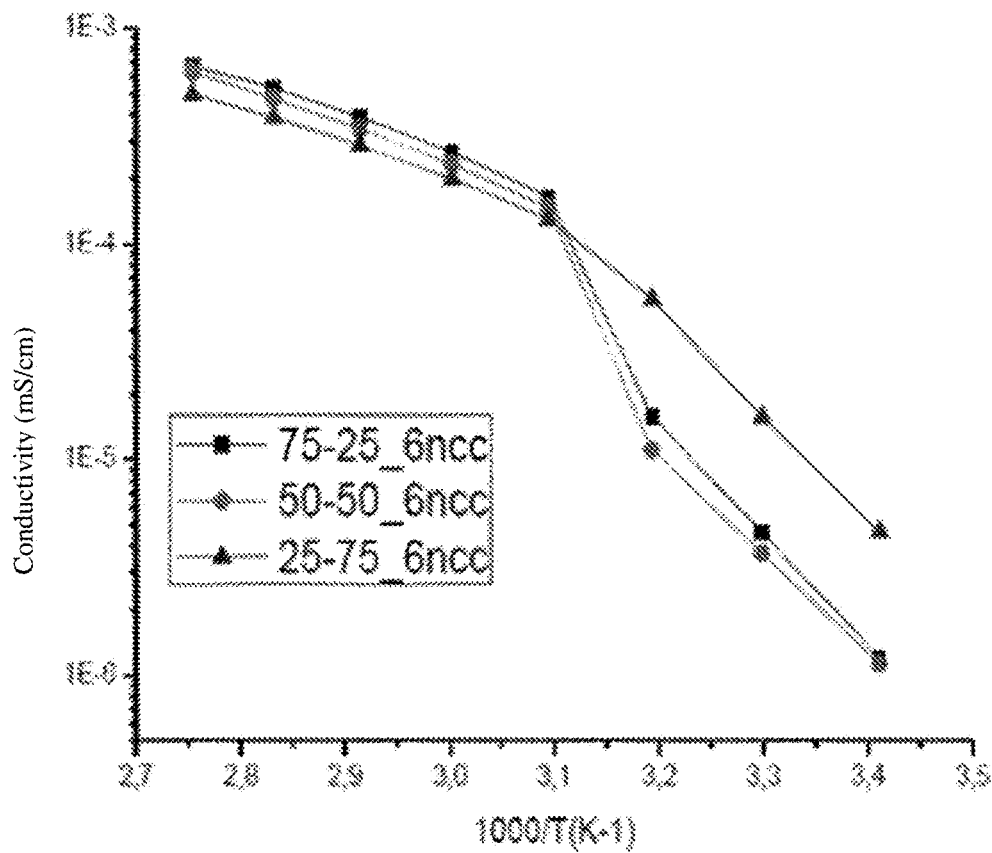
FIG. 12 represents the measurements of conductivities of the films according to examples 14, 17 and 18.

FIG. 12 represents the results obtained. The conductivity measurements are similar at high temperatures for the three samples, with a conductivity at 90° C. (1000/T=2.75) of between 5 and 7 mS/cm.

The conductivity at a temperature less than the melting temperature of the POE (43° C.) falls for the samples containing the greatest proportion of POE, but maintained at a higher level for the sample containing only 25% by mass of POE. This is mainly due to the NPC1000 which prevents the formation of POE crystallites.

Figure 13:
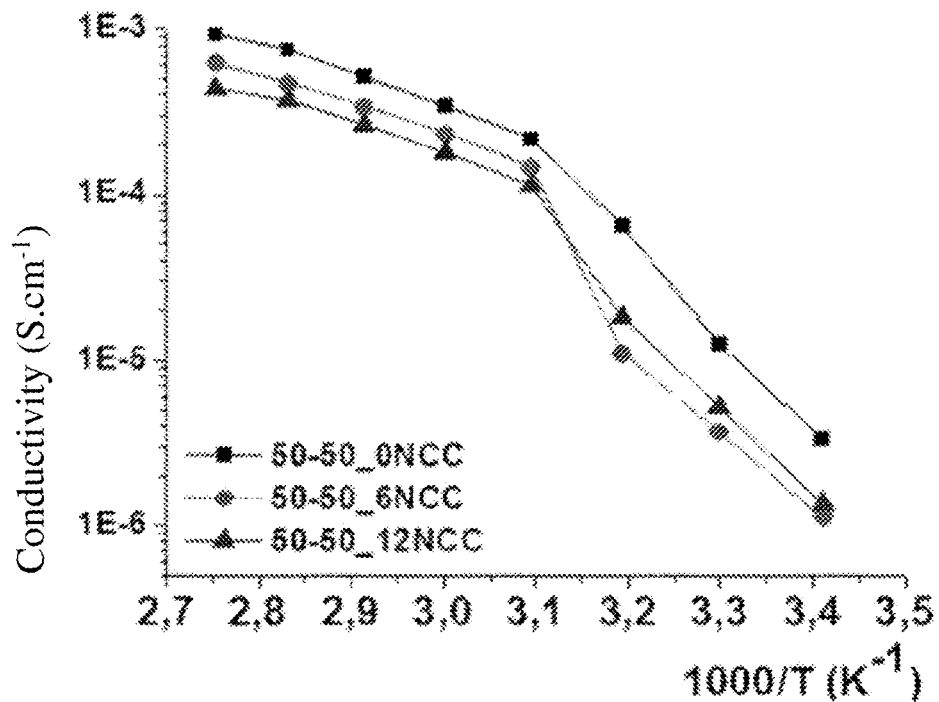
FIG. 13 represents the measurements of conductivities of the films according to examples 17, 20 and 21.

Conductivity measurements have also been taken on films according to examples 17, 20 and 21 in order to study the effect of the quantity of NCC on the conductivity. FIG. 13 represents the results obtained. These results show that introducing reinforcing fillers has the consequence of decreasing the conductivity of the samples. For example, at 1000/T=2.75 that is T=90° C., which is representative of the temperature for using solid electrolytes, the non-reinforced film according to example 20 has a conductivity of $1.10^{-3}$ mS/cm, that containing 6% by mass of NCC (example 17) has a conductivity of $7.10^{-4}$ mS/cm and that containing 12% by mass of NCC (example 21) has a conductivity of $4.5.10^{-4}$ mS/cm. Therefore, there is a decrease in performance by a factor 1.5 for the sample at 6% and by a factor 2 for the sample containing 12% of NCC. However, these electrochemical performance losses remain limited in comparison with the mechanical reinforcement gained by the reinforced films.

Dendritic Growth Measurements

The dendritic growth measurements are taken with a VMP300 potentiostat of the brand BioLogic, coupled with a computer to process data.

A piece of film is assembled between two metal lithium electrodes, by hot-rolling. A direct current of low intensity (2 mA) is established at the terminals of the sample in order to cause the migration of lithium ions from one electrode to the other. The voltage value is measured directly. It must remain stable in the absence of dendrite as it thus corresponds to the potential difference between the two electrodes. When a dendrite pierces the film, voltage peaks are observed, resulting from the short-circuit caused by the putting into contact of the two electrodes by the dendrite.

In the case of a non-reinforced film according to example 21, the first dendrites are observed after 5 hours of functioning.

The same experiment is carried out on reinforced films according to the invention until the depletion of the positive lithium electrode, which is fully drained into the negative electrode. The results are presented in table 4.

TABLE 4 dendritic growth measurements on reinforced films according to the invention

| Sample | Time before draining the positive electrode | Appearance of dendrites |
| --- | --- | --- |
| Example 14 | 25 hours | No |
| Example 15 | 20 hours | No |
| Example 17 | 22 hours | No |
| Example 18 | 19 hours | No |
| Example 19 | 19 hours | No |

The duration before the complete consumption of the positive electrode varies, as the films do not all have the same thickness, slowing down the transportation of the lithium. However, these results show that all the films according to the invention prevent the dendritic growth, even after almost 20 hours of use.

Preparation of Reinforced Films Based on Crosslinkable POE Polycondensate (PC) (Polymer A), POE (Polymer B) and NCC or NCC/Chitosan (Reinforcing Filler C) According to Method 3

Example 22: Synthesis of a POE/NPC1000 (80/20) Film Containing 10% of NCC and 1.33% of Chitosan In a 60 ml container, 1.20 g of POE and 0.3 g of PC1000 are dissolved according to example 10 in 43.8 mL of distilled water then 0.39 g of LiTFSI and 0.02 g of chitosan are added. A dispersion of NCC at 2.3% in distilled water is prepared by mixing 2.56 g of NCC in 110 mL of distilled water using an ultra-turrax-type high-power homogeniser. 6.9 mL of this dispersion (that is 0.16 g of NCC) are then added and the mixture is stirred vigorously. Then, 0.15 mg of 4,4'-azobis(4-cyanovaleric acid), a polymerisation initiator, are added to the preparation and poured into a cylindrical tube and frozen with liquid nitrogen and finally water is removed by lyophilisation. The samples are then hot-pressed (between 80 and 90° C.) to trigger the crosslinking through free-radicals and to obtain semi-interpenetrated network films (≈300 µm thick).

Example 23: Synthesis of a POE/NPC 1000(80/20) Film Containing 10% of NCC

In a 60 ml container, 1.23 g of POE and 0.3 g of PC1000 are dissolved according to example 10 in 44.1 mL of distilled water then 0.40 g of LiTFSI are added. A dispersion of NCC at 2.3% in distilled water is prepared by mixing 2.56 g of NCC in 110 mL of distilled water using an ultra-turrax-type high-power homogeniser. 7.4 mL of this dispersion (that is 0.17 g of NCC) are then added and the mixture is stirred vigorously. Then, 0.15 mg of 4,4'-azobis(4-cyanovaleric acid), a polymerisation initiator, are added and preparation is poured into a cylindrical tube and frozen with liquid nitrogen and finally water is removed by lyophilisation. The samples are then hot-pressed (between 80 and 90° C.) to trigger the crosslinking through free-radicals and to obtain semi-interpenetrated network films (≈300 µm thick).

Mechanical Characterisation by DMA

The membranes are characterised between −100° C. and +180° C. using a DMA TA Q800. The samples are rectangular films having dimensions close to 10×5.0×0.3 (L×l×e in mm). The samples are cooled down to −100° C. then the films are heated at a speed of 2° C./min up to 180° C. by subjecting a deformation of 0.05% to a frequency of 1 Hz.

Figure 14:
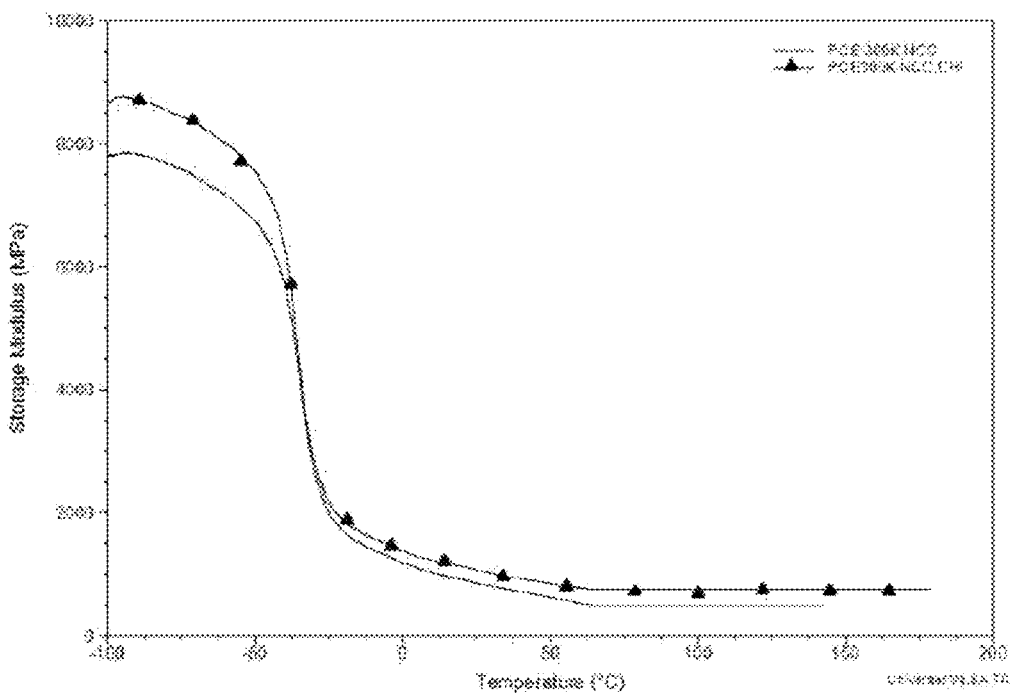
FIG. 14 represents the mechanical characterisation curves by DMA of the films according to examples 22 and 23.
Figure 15:
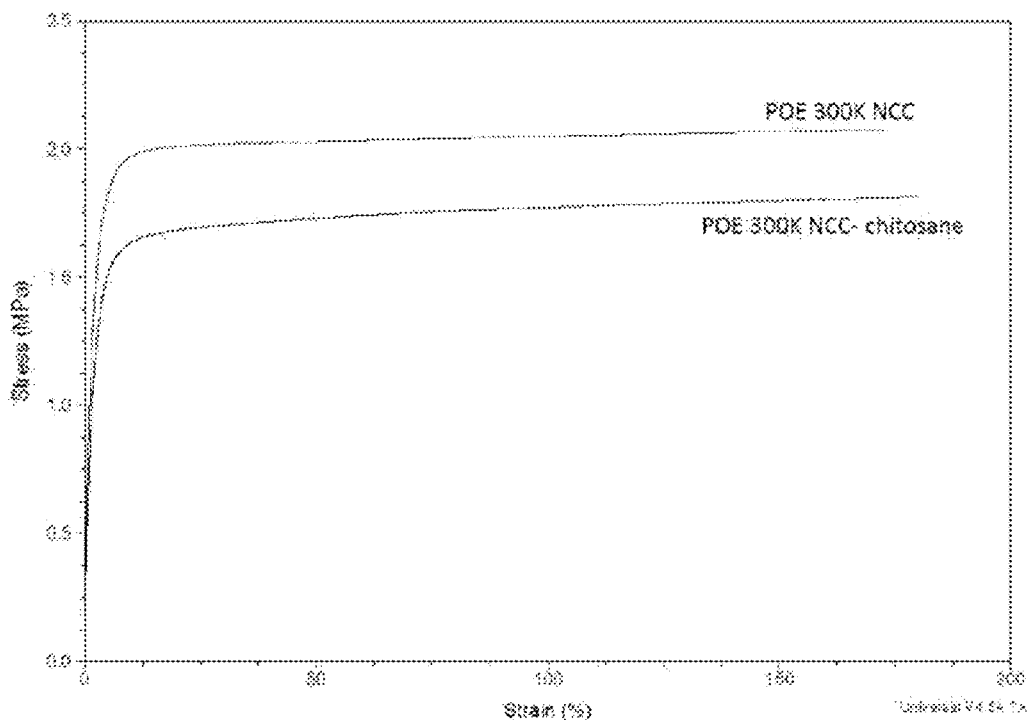
FIG. 15 represents the mechanical characterisation curves extended from the films according to examples 22 and 23.

FIG. 14 represents the results obtained. The addition of chitosan leads to an increase of the low-temperature storage modulus of around 1000 MPa but does not delay the temperature to which the first fall of modulus takes place. The addition of chitosan also makes it possible to maintain a storage modulus of more than 500 MPa on more than an additional 50° C.

Characterisation by Traction Testing

The membranes have been characterised with DMA TA Q800 by carrying out traction tests at 30° C. with an extending speed of 0.1N/min. The samples are rectangular films having dimensions close to 10×5.0×0.3 mm The addition of chitosan leads to a slight increase in the deformation to the rupture. The Young modulus is not modified, but the plastic deformation seems more significant (substantially greater gradient).

The invention claimed is:

1. An ionically conductive material comprising:
   a polymer A, polymer A having an ionic conductivity of between $10^{-5}$ and $10^{-3}$ S/cm;
   a polymer B, polymer B being different than polymer A and having a storage modulus (E') of at least 200 MPa; and
   a reinforcing filler C, wherein the reinforcing filler C comprises a mixture of at least one nanocellulose and at least one material selected from the group consisting of chitin, chitosan, gelatin, and sericin.

2. The ionically conductive material according to claim 1, wherein polymer B is selected from the group of polymers consisting of
   semi-crystalline polymers having an amorphous phase between a glass-transition temperature no greater than 20° C. and a melting temperature greater than or equal to 110° C.;
   ionic semi-crystalline polymers;
   amorphous polymers having a glass-transition temperature greater than or equal to 110° C.;
   poly(phenylene oxides), poly(phenylene) sulfides, polysulfones, polyether sulfones, and polyamide-imides, in neutral or ionic form,
   and mixtures thereof.

3. The ionically conductive material according to claim 1, wherein the at least one polymer A is selected from among polymers comprising an oxyalkylene chain in the main chain or in a pendant chain.

4. The ionically conductive material according to claim 1, further comprising at least one alkaline or alkaline earth metal salt.

5. A film comprising an ionically conductive material according claim 1.

6. The film according to claim 5, wherein the film is an infiltrated film and in that polymer A is infiltrated in polymer B.

7. A separator for an electrochemical generator, comprising an ionically conductive material according to claim 1.

8. A polymer electrolyte for an electrochemical generator, comprising an ionically conductive material according to claim 1.

9. An electrode for an electrochemical generator, comprising an ionically conductive material according to claim 1.

10. An electrochemical generator, comprising an ionically conductive material according to claim 1.

11. A method for producing a film according to claim 5, comprising the following steps:
    preparing a mixture of polymer A, polymer B, reinforcing filler C, and, optionally, a salt, and a solvent;
    applying the mixture to a support to form a coated support; and
    removing the solvent to form a film of the ionically conductive material on the support.

12. A method for producing a film according to claim 5, comprising the following steps:
    preparing a mixture of polymer A, polymer B, and reinforcing filler C, and a solvent;
    lyophilising the mixture to obtain a dried composition; and
    hot-pressing the dried composition to obtain a film.

13. A method for producing an infiltrated film according to claim 6, comprising the following steps:
    obtaining a porous film of polymer B; and
    infiltrating polymer A into the porous film of polymer B.

14. The ionically conductive material according to claim 1, wherein polymer B has a storage modulus (E') of between 200 and 5000 MPa.

15. The ionically conductive material according to claim 1, wherein polymer B has a storage modulus (E') of between 350 and 1500 MPa.

16. A method for producing an infiltrated film according to claim 13, wherein infiltrating polymer A into the porous film of polymer B further comprises
    infiltrating macromonomer precursors for polymer A into the porous film of polymer B; and
    polymerizing the infiltrated macromonomer precursors to form polymer A on the porous film of polymer B.

17. The method for producing a film according to claim 11, wherein the solvent is water.

18. The ionically conductive material according to claim 1, wherein
    polymer B is an ionic polymer and exhibits at least one of an amorphous structure and a semi-crystalline structure.

19. The ionically conductive material according to claim 1, further comprising
    a conductive filler selected from the group consisting of carbon fibers, carbon powder, graphene, carbon nanotubes, acetylene black, graphitic materials, and mixtures thereof,
    an active material selected from the group consisting of lithium iron phosphate ($LiFePO_4$) (LIP) and lithium cobalt oxides ($Li_xCoO_2$).

* * * * *